R. D. ELLIOTT.
PROCESS OF PRESERVING ORGANIC MATERIAL.
APPLICATION FILED MAR. 9, 1914.
1,126,430.
Patented Jan. 26, 1915.
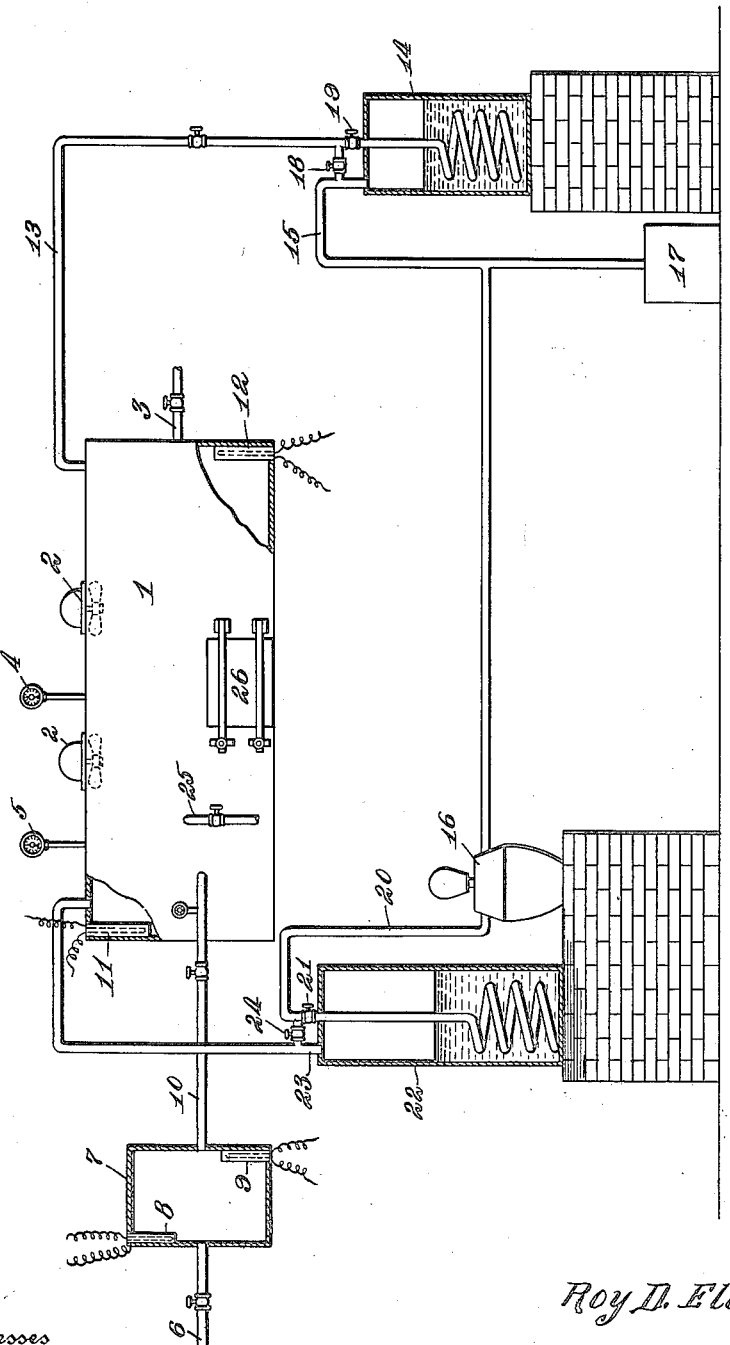
Witnesses
Inventor
Roy D. Elliott
By K. P. McElroy
Attorney

UNITED STATES PATENT OFFICE.

ROY D. ELLIOTT, OF SAN FRANCISCO, CALIFORNIA.

PROCESS OF PRESERVING ORGANIC MATERIAL.

1,126,430.  Specification of Letters Patent.  Patented Jan. 26, 1915.

Application filed March 9, 1914. Serial No. 823,544.

*To all whom it may concern:*

Be it known that I, ROY D. ELLIOTT, a citizen of the United States, residing at San Francisco, in the county of San Francisco and State of California, have invented certain new and useful Improvements in Processes of Preserving Organic Material, of which the following is a specification.

This invention relates to processes of preserving organic material; and it comprises a method of preserving organic material, wherein such material is first subjected to antisepsis by means of ozone, the ozone in excess is then removed and the material is subsequently preserved under aseptic conditions; all as more fully hereinafter set forth and as claimed.

The object of the present invention is to provide a simple, cheap and ready method of preserving for relatively long periods meats, eggs, fruits and other foods, museum specimens, and in general all perishable organic materials. Most of these materials in their natural state are already sterile in their deeper tissues or parts and decay or corruption is largely due to superficial infection; to the presence on the surfaces of various microörganisms such as bacteria, yeasts, molds, etc. While not all these organisms are air-borne, many coming from handling and all manner of superficial contamination, yet it is but rarely in fairly fresh material that they occur beyond the surfaces in contact with the atmosphere. In the current art many methods of arresting the activity of these organisms or of killing them are in use; but each process has its own defects, one of which, and not the least, is the lack of certainty of sterilization. The consumer has no assurance that the goods are not contaminated with highly pathogenic or disease-producing organisms. Refrigeration merely arrests bacterial and yeast activity, which rebegins as soon as the temperature rises and, usually, does not altogether cease even at comparatively quite low temperatures. Chemical sterilizers or antiseptics which remain in the food are of course usually objectionable; and sterilization by heat is not possible or desirable with very many food articles, such as eggs, fresh fruits, etc.

In another and prior Patent, No. 1,061,460 granted May 13, 1913, I have described and claimed another method of preservation resting upon the principle of producing an initial antisepsis of the surface of the material by a volatile antiseptic, this treatment being continued until viable organisms no longer occur, then removing this antiseptic by absorption and thereafter maintaining the material under aseptic conditions. In the practical embodiment of the method as there disclosed, the material was treated in a closed chamber with an atmosphere containing sulfur dioxid and, after a proper length of time to cause complete superficial sterilization of the material, such atmosphere was circulated in closed cycle past absorbents for sulfur dioxid until this substance was removed, not only from such atmosphere but also from the surfaces of the material. Thereafter the material remained in contact with such atmosphere. Suitable means were described for adjusting the moisture content of the atmosphere. I have now found that in the practice of such a method I can use ozone or ozonized air with great advantage. As ozone can be electrically produced, I am enabled to use an apparatus in which everything can be put into operation by throwing a switch. In practice, I have found that ozone produces an unusually rapid and complete surface sterilization of materials of the class described without any permanent or lasting effect on the materials themselves. In this its action much resembles hydrogen peroxid while, being a gas, the excess is easily removed. Practically it goes wherever the air can go or has gone and since, as stated, decay organisms are never beyond the reach of air, it produces a complete sterilization. The products of its action on sensitive living tissue, such as that of the cells of microörganisms, are mainly oxygen, water and carbon dioxid; that is, it forms nothing foreign to or hurtful to the material. No bacteria, yeasts or molds can resist its action, and it diffuses very rapidly into all air-filled pores of the material. In penetrating these pores however it rapidly disappears after exercising its peculiar action, and, as stated, without leaving anything foreign or hurtful behind. The operation is one which can be conducted in a chamber or container of any kind. After the sterilization is complete, any residual ozone in the chamber atmosphere or the contents of the chamber may be rapidly removed. The chamber itself and all its walls are sterilized with equal completeness.

In dealing with eggs, fruits, etc., I have found it a useful expedient to put the articles into the cartons or containers in which they are intended to remain and to sterilize the articles and containers simultaneously. After removing the excess of ozone, as by a cyclic circulation of the chamber atmosphere through alkaline pyrogallic acid, over wet iron filings, through a hot tube, etc., both chamber and the containers are permanently sterile or aseptic. It is best to use an absorbent like pyrogallic acid as this not only removes ozone but oxygen as well. Absence of oxygen is an advantage with many materials, as for instance, eggs which often carry certain strictly aerobic bacteria, the action of which is arrested by the absence of oxygen.

In the accompanying illustration I have shown more or less diagrammatically, partly in vertical section and partly in elevation, an organization of apparatus elements convenient for use in the described process.

In this showing, 1 is a preserving chamber. At its top it may be equipped with motor driven fans 2 for keeping the atmosphere of the chamber in circulation during the operation. The chamber is best so arranged as to be air tight and capable of withstanding a few pounds extra pressure or a few pounds vacuum. A slight vacuum may be produced within the chamber through valved conduit 3. Vacuum gage 4 and pressure gage 5 are provided for indicating the pressure within the chamber. Air or oxygen may be supplied through valved conduit 6 to preliminary or ozonizing chamber 7, shown as provided with two ozonizers 8 and 9 which may be of any common or commercial type designed for high yield. Valved pipe 10 establishes communication between this ozonizing chamber and the main chamber. Additional ozonizers 11 and 12 may be provided within the preserving chamber. Two are shown but there may obviously be as many as may be desired. A circulating system is provided whereby the chamber atmosphere may be placed in cyclic circulation. This system comprises pipe 13 leading to an air scrubbing device 14. From this leads pipe 15 to pump 16, trap 17 being provided to catch any entrained material. Valved pipe 18 acts as a bypass around the scrubbing device. When it is used, valve 19 may be closed. On the pressure side of the pump, pipe 20 provided with valve 21 leads into another scrubbing device 22 having outlet 23 returning back to the chamber. A valved bypass 24 allows this scrubbing device to be cut out of circuit. On the chamber, pipe 25 may be provided for withdrawing samples of the atmosphere from time to time for the purposes of testing. Door 26 allows access to the chamber.

In the use of the described apparatus the goods to be preserved which may be, as in the case of eggs, fruit, etc., in cartons or containers, are placed in chamber 1 through door 26. The door is now closed and a partial vacuum produced in the chamber by applying suction on 3. When the vacuum gage shows five or more pounds, suction is stopped. Ozonizers 8 and 9 are now started and air allowed to flow in through 6. The ozonized air passes into the chamber through 10. The air or oxygen may be forced into 6 until the pressure gage on the main chamber shows a plus pressure of about five pounds. At this time the circulating fans 2 are started to produce a thorough commixture of the ozonized air with the chamber atmosphere. Ozonizers 11 and 12 may also be placed in action. During this operation a valve on 10 may be closed and ozonizers 8 and 9 stopped. Samples of the atmosphere of the chamber are taken from time to time through pipe 25 and tested for ozone. After ozone appears in the atmosphere the operation is continued for a sufficient length of time to produce good antisepsis. The time required varies, naturally, very much with different materials and the percentage of ozone. Generally an hour to 10 hours is required. Where eggs, etc., are contained in cartons a much longer time may be required as it is necessary for the air within the cartons and the ozonized atmosphere without to diffuse. It is usually best to leave the cartons open. Naturally the cartons and the food articles may be separately sterilized at the same time within the chamber.

In sterilization with ozone, it is a useful expedient to vary the pressure from time to time. This is practically desirable where the material is in cartons or other containers or is in layers. For example, after the chamber has been working under five pounds plus pressure for a time, the valve in 3 may be opened and a slight suction produced, say five pounds, and the operation continued. After a time more ozonized air may be forced in through 6 and 10 until a plus pressure prevails within the chamber. This alternation of slight pressure and vacuum contributes materially to shortening the operation by facilitating the penetration of ozone into the pores and into containers, etc. If difficulty is experienced in getting sufficiently high yield of ozone, oxygen under pressure in a drum is allowed to flow in at 6. This admits production of an atmosphere highly charged with ozone.

After sufficient antisepsis has been produced, pump 16 may be started into operation and the chamber atmosphere placed in cyclic circulation through 13, 15, 20 and 23. Scrubber 14 having been filled with alkaline pyrogallic solution to absorb ozone and oxygen, the circulation may be through this, cock 19 being opened and 18 closed. This will remove the ozone and oxygen. Trap 17 is provided to take care of any entrained alkaline solution that may go over. Scrubber 22 may be filled with sulfuric acid of any strength desired to adjust the moisture content in the circulating atmosphere. Adjustment of the moisture content is a very useful precaution since on the one hand in subsequent aseptic preservation it is not desirable to have the chamber atmosphere too dry as fruits, etc., will shrivel and dry up, while on the other hand, it should not be too moist, moist enough to permit deposit of dew or moisture on changes in temperature. Weak sulfuric acid gives up moisture to dry air and strong sulfuric acid takes up moisture from moist air. A sulfuric acid can be selected of a strength which will produce any moisture relation desired in the chamber atmosphere.

By the use of bypass 24 as much or as little of the chamber atmosphere as may be desired may be shunted through 22. It is often desirable merely to reduce the moisture content of the chamber atmosphere somewhat and in this case strong sulfuric acid may be placed in 22 and enough of the chamber atmosphere passed into contact with it by opening 21 and closing 24 to produce the desired amount of desiccation. During this operation the atmosphere in the container may be tested at 25 from time to time. After the ozone has disappeared the contents of the chamber are capable of indefinite keeping. Generally, I not only remove the ozone but the oxygen from the chamber. I may of course in this aseptic preservation use other atmospheres than the residual nitrogen resulting from the absorption of oxygen and ozone. I may for instance pump in carbon dioxid through 6 while removing chamber atmosphere through 3 until chamber 1 is full of such dioxid. In so doing, where alkaline pyrogallic solution is used as the ozone absorbent, introduction of carbon dioxid should be postponed until after the completion of the cyclic circulation. This cyclic circulation of course has as its object not only to remove the ozone from the chamber atmosphere but also to remove it from the surfaces of the food, the interior of cartons, etc. Carbon dioxid is absorbed by alkaline pyrogallic acid. However, if 14 be filled with iron filings moistened with sulfuric acid or with other oxygen absorbents, carbon dioxid may be introduced through 6 as soon as the sterilization is complete.

In the case of eggs and many other foods I regard it as desirable to remove the oxygen from the chamber atmosphere. With some articles of food, like sweet potatoes, removal of the oxygen is unnecessary. I generally allow the container to remain under a slight plus pressure during the period of preservation under asepsis as this prevents inward leakage of air carrying germs, and prevents evaporation.

If it is desired to prepare the goods for shipment, or for the retailer, operators may enter the chamber after sterilization is effected and ozone has been removed, and seal the goods in sterile packages. The operators should wear surgeons' garb and enter by means of a vestibule which is sterilized after they have entered, by smearing the walls with glycerin and circulating the air by means of an electric fan for a few moments. When the door between the vestibule and the storage chamber is opened no organisms can gain ingress to the storage chamber due to their adhesion to the glycerin.

While I have shown and described a single large chamber in which the material to be preserved may be treated, it is obvious that the same process may be applied to smaller chambers, such as cartons or other containers for carrying the material. For example, in preserving eggs, the eggs may be treated in the large chamber as described and then placed in cartons; or they may be sterilized in the cartons in the large chamber. Or each carton may be individually treated; or a number of them may be simultaneously treated without the use of the described large chamber. For example, an egg carton may be provided with two openings and ozone or ozonized air introduced in the manner described. In such an operation the small chamber of the carton has the same function as the large chamber previously described. If an egg carton is provided with two small openings and ozone allowed to flow in or displace the air, after the displacement the openings may be sealed or closed. After sterilization the openings may be unsealed and sterile atmospheric air or nitrogen pumped in until the ozone is displaced. The sealing may then be again resorted to. This last operation is a desirable way of treating fruit, eggs and vegetables for shipment and for the retailer.

What I claim is:—

1. In the preservation of organic materials, the process which comprises maintaining such materials in an atmosphere comprising ozone until sterilization is effected, removing ozone from the atmosphere and the materials and thereafter maintaining such materials in an aseptic atmosphere.

2. In the preservation of organic materials, the process which comprises exposing such materials to an atmosphere comprising ozone until sterilization is effected, the pressure of such atmosphere being varied from time to time, removing ozone from the atmosphere and the materials and thereafter maintaining such materials in an aseptic atmosphere.

3. In the preservation of organic materials, the process which comprises exposing such materials in a suitable chamber to an atmosphere comprising ozone until sterilization is effected, cyclically circulating the chamber atmosphere through ozone-absorbing means until it no longer shows a reaction for ozone and thereafter maintaining such materials in such atmosphere.

4. In the preservation of organic materials, the process which comprises exposing such materials in a suitable chamber to an atmosphere comprising ozone until sterilization is effected, removing the atmosphere of the chamber, transmitting it past ozone-absorbing means and returning it to the chamber and thereafter maintaining the materials in the ozone-free, aseptic atmosphere so produced.

5. In the preservation of organic materials, the process which comprises exposing such materials in a suitable chamber to an atmosphere comprising ozone until sterilization is effected, cyclically circulating the chamber atmosphere through ozone-absorbing means until it no longer shows a reaction for ozone, adjusting the moisture content of said atmosphere and thereafter maintaining such materials in the aseptic atmosphere of adjusted moisture content so produced.

6. In the preservation of organic materials, the process which comprises ozonizing air and bringing the ozonized air into contact with such materials in a suitable chamber, maintaining ozone in the air in contact with the materials in the chamber against any tendency to disappear till sterilization is effected, removing the ozone from the air and thereafter maintaining such material in the deozonized, aseptic atmosphere so produced.

7. In the preservation of organic materials, the process which comprises exposing such materials in a suitable receptacle to an atmosphere comprising ozone until sterilization is effected, removing the atmosphere containing ozone and replacing by a sterile ozone-free atmosphere and thereafter maintaining the materials in said sterile atmosphere.

8. In the preservation of organic materials the process which comprises exposing such materials in a suitable receptacle to an atmosphere comprising ozone until sterilization is effected, removing such atmosphere by displacing it with sterile inert gas and thereafter maintaining the materials in said sterile inert gas.

In testimony whereof, I affix my signature in the presence of two subscribing witnesses.

ROY D. ELLIOTT.

Witnesses:
E. N. SHAW,
E. P. SCHMIDT.